United States Patent

[11] 3,602,972

[72] Inventor Hans Droll
 Nording 75, Bergen-Enkheim, Germany
[21] Appl. No. 868,371
[22] Filed Oct. 22, 1969
[45] Patented Sept. 7, 1971
[32] Priority Apr. 17, 1969
[33] Germany
[31] P 19 19 433.3

[54] APPARATUS FOR FORMING AND TRANSFERRING COILS FOR STATORS
11 Claims, 3 Drawing Figs.
[52] U.S. Cl. .................................................. 29/205 R, 29/205 D
[51] Int. Cl. ...................................................... H02k 15/06

[50] Field of Search ............................................ 29/205, 205 D, 605, 606

[56] References Cited
UNITED STATES PATENTS
3,324,536  6/1967  Hill .............................. 29/205

Primary Examiner—Thomas H. Eager
Attorney—Larson and Taylor

ABSTRACT: Apparatus including circularly arranged transfer bars movable to protrude axially from the front end of a former to automatically transfer wound coils from the former to mounting fingers of a device which inserts the wound coils in the stator grooves. A control device regulates feeding of wire to the former to form the coils in a manner which facilitates subsequent transfer of the coils from the former.

Inventor:
HANS DROLL
ATTORNEYS

APPARATUS FOR FORMING AND TRANSFERRING COILS FOR STATORS

BACKGROUND OF THE INVENTION

This invention relates to the production of wound stator coils, and in particular it relates to transferring wound stator coils from a former to a device which inserts the coils into the stator grooves.

It has been known heretofore to wind individual coils or a plurality of concentric coils on a former and then to remove the coils and mount them in a device for inserting the coils into the stator grooves. Heretofore, removal of the coils from the former has been carried out by means of a circularly arranged set of parallel transfer bars. The bars are inserted into spaces in the former from the front of the former after which the coils are slid onto the bars. The bars are then transferred to a position adjacent the mounting fingers of a coil inserting device and slid onto these fingers from which they were subsequently inserted into the stator grooves. The U.S. Pat. to D. E. Hill, Pat. No. 3,324,536 issued June 13, 1967, illustrates a known device including mounting fingers for receiving the coils from the set of transfer bars and inserting the coils into the stator grooves.

However, this known procedure has several disadvantages. First of all excessive time is required to carry out the manual operations and this of course limits the winding capacity of the apparatus since one could certainly not wind coils more quickly than the said coils could be removed from the former and transferred to the coil inserting device. Moreover, the task of transferring coils becomes quite strenuous when forming and transferring large heavy coils for larger stators.

It has also been known heretofore to wind coils directly onto groups of bars which act concurrently as a former and a transfer bar. Of course this facilitates the task of transferring the wound coils. However, this procedure is undesirable since it does not permit sufficient control of the shape of the coil and because it is virtually impossible to subsequently correct or change the shape of coils so formed. Thus, such bars serving concurrently as formers and transfer bars are quite undesirable in almost all cases.

Of course one possibility for simplifying the transfer of wound coils might be to simply build a machine to handle the set of transfer bars through its various movements first to the former and then over to the mounting fingers of the inserting device. However, it is felt that such a machine would be uneconomically expensive and thus one would simply be substituting one problem for another if one proceeded in this manner.

Thus, there exists a need for an apparatus for transferring wound coils from a former to an inserting device, which apparatus simplifies the transferring task, and does so in an economical manner.

SUMMARY OF THE INVENTION

Thus, it is a purpose of this invention to provide a new and improved coil transferring apparatus which overcomes disadvantages in the prior art.

This purpose of the present invention is carried out by providing an apparatus which automatically transfer coils from the former or formers to the inserting device wherein the set of parallel bars used for transferring the coils are mounted in the former itself and permitted to move axially therein to a transfer position wherein the outer ends of the bars protrude outwardly from the front end of the former. The protruding transfer bars are then placed into contact with the mounting fingers of the inserting device after which the wound coils are simply slid off the formers and along the outer portions of the transfer bars and directly on to the mounting fingers. Thus, in contrast to one possible but expensive suggestion of simply automating the known manual procedure, in the present case the task of automating the transferring operation is greatly simplified by so locating the transfer bars in the former such that they protrude from the rear out beyond the front face of the former.

Additional advantages are achieved by using the present invention. In the past, it was necessary to remove the coils from a given former individually so that the individual coils could be placed into their correct positions on the mounting fingers of the inserting device. Thus, when gathering a plurality of coils from individual formers, it was necessary to carry out this removing operation several times. In contrast thereto, with the present invention it is possible to use a plurality of formers and to so arrange the transfer bars relative to these formers that the coils from all formers may be removed simultaneously and moved along the transfer bars to the correct mounting fingers of the inserting device.

Heretofore, little or no importance was attached to the particular procedure for winding the coils onto the formers. Even if the wires were misplaced one on top of the other, it was a simple task to loosen them by hand during the manual transferring procedure. However, in the present case wherein the transferring task is performed completely by machine without any manual operation, it is important that care be taken to avoid jamming or damage to the wires during the winding operation. Thus, for carrying out this result, it is a further feature of the present invention to provide, in combination with the former, an arrangement wherein the rotational speed of the winding device is correlated with the axial motion of the winding device, relative to the former, so that the wires will be placed onto the formers in a single layer without crossing over each other.

Thus, it is an object of this invention to provide a new and improved coil transferring apparatus.

It is another object of this invention to provide a new and improved coil transferring apparatus including a set of transfer bars which protrude outwardly from the front of a former whereby coils on the former can be transferred along these transfer bars and directly onto mounting fingers of a coil inserting device wherein the coils are inserted into stator grooves.

It is another object of this invention to provide an apparatus for automatically and economically transferring wound coils from a former or a plurality of formers onto mounting fingers of a coil inserting device.

It is another object of this invention to control the winding of the wire onto the formers such that the coils comprise a single layer wherein the wires of the coil do not cross over each other.

Other objects and the intended advantages of the present invention will become apparent from the detailed description to follow, together with the accompanying drawings.

BRIEF DESCRIPTION OF THE DRAWINGS

There follows a detailed description of a preferred embodiment of the invention to be read together with the accompanying drawings, the description and the drawings being provided only to illustrate a preferred embodiment of the invention.

DETAILED DESCRIPTION OF THE PREFERRED EMBODIMENT

Figure 1:
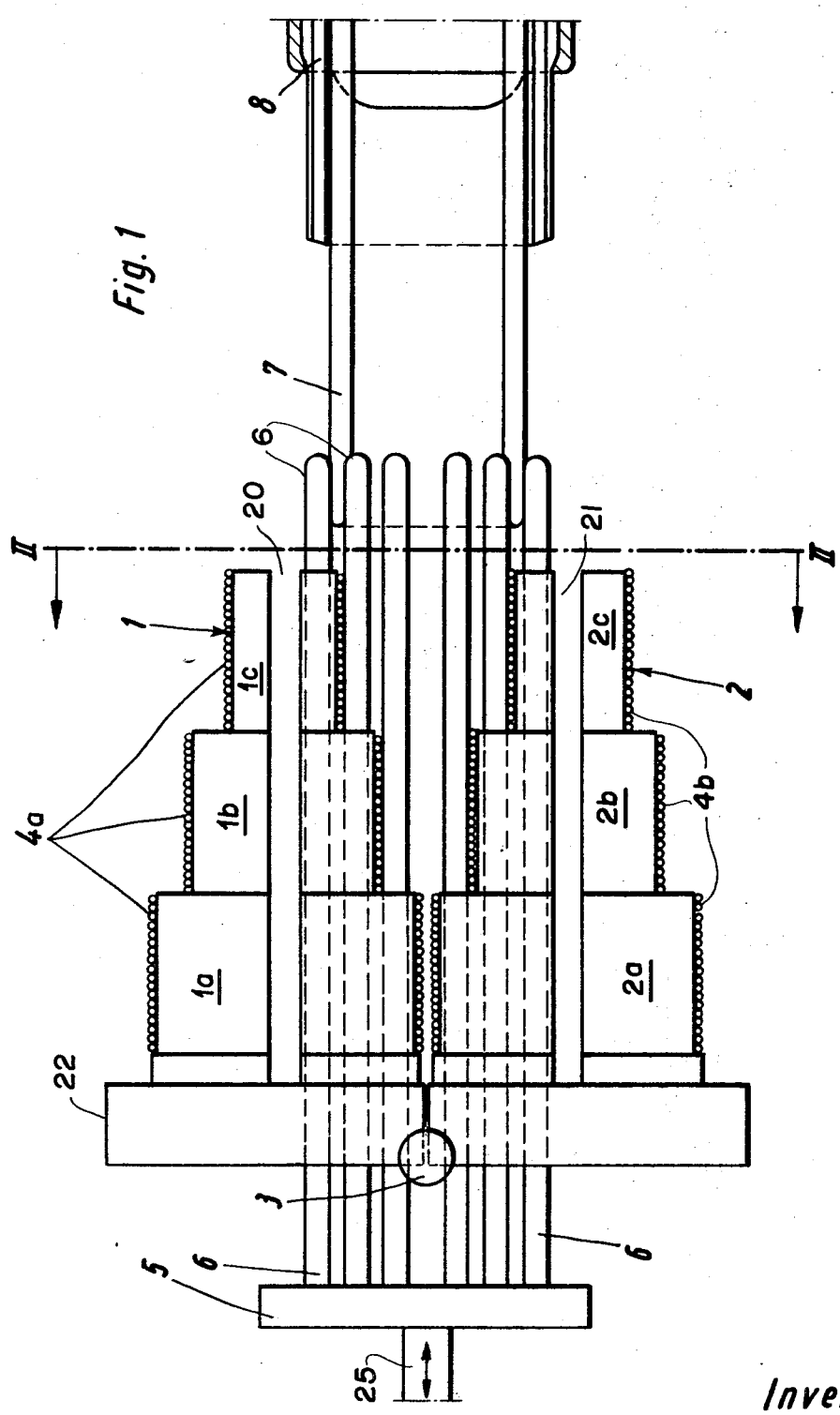
FIG. 1 is a plan view of an apparatus constructed in accordance with the features of the present invention and showing also a portion of a coil inserting device.

Referring now to the drawings, like numerals represent like elements throughout the several views.

Figure 2:
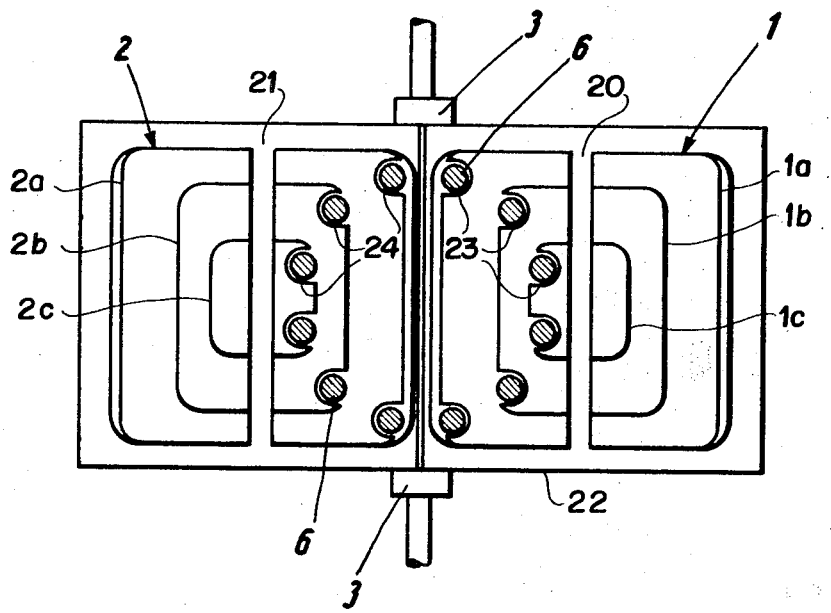
FIG. 2 is a sectional view taken along line 2—2 of FIG. 1.

In FIGS. 1 and 2 there is illustrated a forming apparatus including two separate formers 1 and 2, former 1 includes three steps 1a, 1b and 1 c and former 2 includes three steps 2a, 2b and 2c. Formers 1 and 2 are each constructed in two separate halves spaced apart by spaces 20 and 21, respectively. During winding, each of these spaces is at a maximum, and then after winding, the two halves of each former are moved together, thereby reducing in size the spaces 20 and 21 whereby the coils will lie loosely on the formers thereby facilitating removal of the coils. Coils 4b are shown wound on the former 2.

The formers are mounted on a base plate 22 which is rotatable about the swivel axis of a shaft 3. During winding of the wires onto the formers, the formers would be facing a direction other than that shown in FIG. 1. Then, after the winding operation, the apparatus is turned about the axis of shaft 3 to the position shown in FIG. 1 wherein the front of the formers, that is the right-hand end of the formers in FIG. 1, face the mounting fingers of a device for inserting coils into stator grooves.

The apparatus further includes a baseplate 5 having rigidly attached thereto a set of transfer bars 6 which are circularly arranged, that is the axes of the bars lie in a common cylinder. These bars project through openings 23 and 24 in the formers 1 and 2, respectively. These bars are movable axially of the former, that is from right to left and left to right in FIG. 1, as indicated by the arrow 25 in FIG. 1. Thus, during the winding operation the bars 6 would be withdrawn to the left such that their outer ends remained within the formers so that they would not interfere with the winding operation. After the completion of the winding operation, and after the apparatus has been turned about the axis of shaft 3, the holding plate 5 and its associated bars 6 are then moved to the right (as viewed in FIG. 1) so that the outer ends of transfer bars 6 protrude out beyond the front of the formers.

FIG. 1 also illustrates schematically a coil inserting device including a set of mounting fingers 7 and a stripper member 8. As indicated above, for the details of these elements, reference may be made to the said Hill patent. As illustrated in FIG. 1, the cylinder formed by the mounting fingers 7 would lie generally within the cylinder formed by the transfer bars 6. However, this specific arrangement is not critical Rather, any arrangement will suffice so long as the coils may be conveniently slid along the transfer bars 6 and then onto the mounting fingers 7. Incidentally, since the number of fingers 7 will generally agree with the number of grooves in the stator to be wound, there is no necessary relationship between the number of fingers 7 and the number of transfer bars 6. It is only necessary that the spacing between the various fingers be sufficient so that the coils can conveniently be slid off of the formers, along the transfer bars 6 and onto the mounting finger 7.

Thus, it can be seen that with the present arrangement the coils may be removed from the two formers 1 and 2 simultaneously. It is to be understood that the invention is not limited merely to the use of two formers. It is also possible to use a single former or more than two formers, and in the latter case it would also be possible to remove the coils from all of the formers simultaneously and to slide the same onto the mounting fingers 7.

Removal of the coils from the formers, following the reduction in size of the spaces 20 and 21, is a relatively simple task in and of itself and requires the use of a suitable gripper known per se, and thus not shown in the drawings.

To facilitate efficient removal of the coils from the formers 1 and 2, there is provided, in accordance with another feature of the invention, an arrangement which operates a winding device such that it winds only one layer of wire onto the surface of each step of the formers. This assures that during the step of removing the coils from the formers and onto the mounting fingers 7, the coils will not jam each other, and thus the crossing of wires will be avoided. The width of each step of the former can be selected and constructed of such a size that the largest number of winding required in any given circumstance will just fit onto the said step. If, in a given case, fewer windings are necessary on a given step, then the pitch, that is the space between each wire will be modified.

Figure 3:
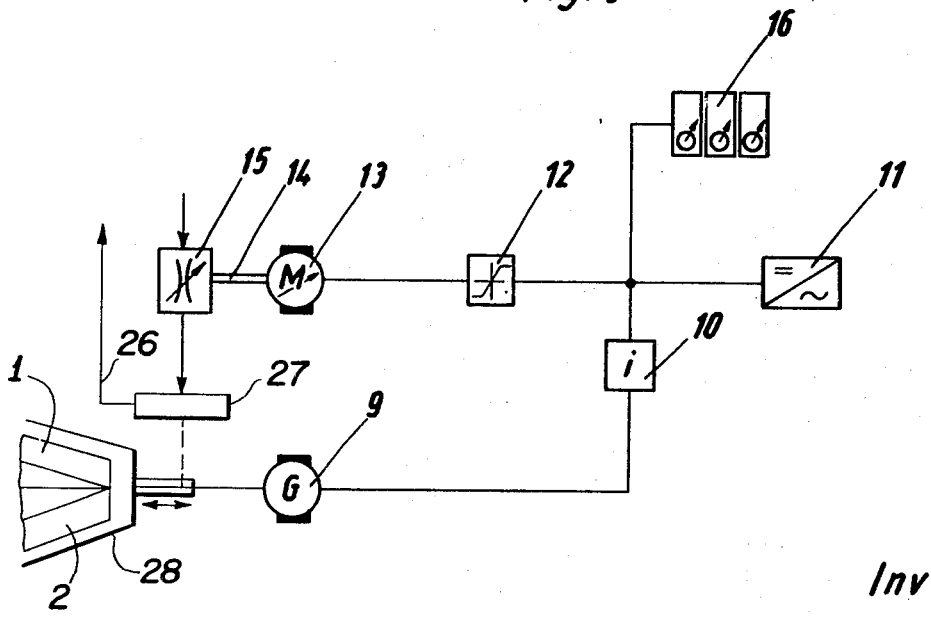
FIG. 3 is a schematic drawing illustrating the circuit for controlling operation of the winding device.

In order to achieve the proper pitch of the wire winding in any given case and in order to avoid crossing of the wires, the feeding of the winding device axially relative to the former must not be maintained at a constant value throughout the winding procedure. Rather, it must be governed by the variable rotating winding speed of the winding device. FIG. 3 illustrates a control circuit for carrying out the said feeding of the winding device. There is shown in FIG. 3 a rotating winding device of conventional type and represented symbolically at 28. Axial movement of this winding device is provided by a hydraulic cylinder represented symbolically at 27, this cylinder being operated by fluid passing through a pressure regulator 15 and through line 25 to the cylinder 27. In accordance with a feature of the present invention the pressure at the regulating device 15 is controlled as follows. The apparatus includes a speed responsive signal generator which is responsive to the rotating speed of the winding device 28. This signal from generator 9 is adjusted by a suitable adjusting means 10, such as a resistor or the like to modulate the electricity delivered from a power source 11 through an amplifier 12 to an adjusting motor 13. This adjusting motor 13 turns its main shaft 14 to a certain angle thereby setting the device 15 to determine the pressure of the fluid in line 26. The control signal may be further modified by adjusting devices 16 which may be potentiometers or the like and which include rotating switches as shown in the drawings, for modifying the signal delivered to the motor 13 by multiplying the same with certain constants corresponding to desired feed values. The three switches illustrated may serve to vary the feed values for each of the three steps of the former.

Referring to FIG. 2, it can be seen that the transfer of the wire from one stage of a given former to the next adjacent smaller stage could conceivably take place within the cylinder formed by the transfer bars 6. This would be undesirable since a wire extending from one step to the next step could then possibly lie in the path of a transfer bar 6 as the transfer bars 6 move to their protruding, transfer position. In order to exclude this possibility, in accordance with the present invention, the winding procedure is so controlled that the jump in the feeding from one step to the next will always take place outside of the said cylinder formed by the transfer bars 6. In a preferred development of this feature of the invention, provision has been made that a control device, not shown, is responsive to the angular position of the drive shaft of the winding device whereby axial feeding movement of the winding device from one step to the next is prevented while the winding device is distributing wire within the said cylinder.

Although the invention has been described in considerable detail with respect to a preferred embodiment, it will be apparent that the invention is capable of numerous modifications and variation apparent to those skilled in the art without departing from the spirit and scope of the invention.

I claim:

1. An apparatus for use in the production of coils for stators of electrical machines and the like comprising, a former adapted to have a coil wound thereon, a set of transfer bars extending axially through the former; coil inserting means for receiving a wound coil from the former and inserting the same into the grooves of a stator, said inserting means including a set of generally parallel mounting fingers, said former being positionable in a transfer position wherein said transfer bars are generally parallel to said mounting fingers and wherein the transfer bars protrude axially from said former with their outer end positioned adjacent said mounting fingers whereby a wound coil can be moved from the former, along said transfer bars onto said mounting fingers.

2. An apparatus according to claim 1, wherein said transfer bars are movable axially within said former at least between a withdrawn position, wherein the said outer end are located within the former, and an extended position wherein said transfer bars protrude axially from the front of the former.

3. An apparatus according to claim 1, wherein said transfer bars are arranged circularly such that their longitudinal axes generally define a cylinder.

4. An apparatus according to claim 3, including a plurality of formers arranged parallel to each other, and wherein the said transfer bars are arranged, relative to said formers, such that the coils on the formers can be moved simultaneously from said formers, along said circularly arranged transfer bars to said mounting fingers.

5. An apparatus according to claim 1, wherein said former includes a plurality of steps for forming coils of different outer dimensions, wherein at said transfer position, the coils on all of said steps are moved over said transfer bars to said mounting fingers.

6. An apparatus according to claim 5, including a plurality of formers arranged parallel to each other, each having a plurality of said steps, said transfer bars being arranged circularly to generally define a cylinder, wherein in said transfer position the coils on the two formers can be simultaneously moved from said formers, along said circularly arranged transfer bars to said mounting fingers.

7. An apparatus according to claim 1, including a winding arm rotatable in relation to said former for distributing wire thereon to form said coil, feed means for controlling the axial position of the winding arm relative to said former, and control means for controlling the speed of operation of feed means in response to the speed of rotation of said winding arm, so that the wire is placed onto the former in a single layer so that no wire crosses another wire.

8. An apparatus according to claim 7, wherein said former includes a plurality of steps for forming coils of different outer dimensions, and wherein said control means includes means for controlling the speed of operation of said winding arm as it distributes wire onto all of said steps so that no wire crosses another wire.

9. An apparatus according to claim 8, wherein said transfer bars are arranged circularly to generally define a cylinder, and wherein the control mean is arranged such that movement of the feed means to move the coil from one step of the former to the next occurs radially outside of said cylinder.

10. An apparatus according to claim 7, wherein feed means comprises a fluid cylinder and said control means comprises a signal generally responsive to the speed of rotation of the shaft of the winding arm for varying the pressure of fluid delivered to the fluid cylinder to vary speed of the feed means.

11. An apparatus according to claim 10, including adjusting devices for adjusting said signal to determine the characteristics of the turns of wire of the coils.

Notice of Adverse Decisions in Interferences

In Interference No. 98,264 involving Patent No. 3,602,972, H. Droll, APPARATUS FOR FORMING AND TRANSFERRING COILS FOR STATORS, final judgment adverse to the patentee was rendered Sept. 19, 1973, as to claims 1, 2, 5, 7 and 8.

[*Official Gazette December 25, 1973.*]